(12) United States Patent
Bright

(10) Patent No.: US 8,682,872 B2
(45) Date of Patent: Mar. 25, 2014

(54) INDEX PAGE SPLIT AVOIDANCE WITH MASS INSERT PROCESSING

(75) Inventor: Randol K. Bright, Austin, TX (US)

(73) Assignee: BMC Software, Inc., Houston, TX (US)

( * ) Notice: Subject to any disclaimer, the term of this patent is extended or adjusted under 35 U.S.C. 154(b) by 448 days.

(21) Appl. No.: 12/640,549

(22) Filed: Dec. 17, 2009

(65) Prior Publication Data

US 2011/0153580 A1 Jun. 23, 2011

(51) Int. Cl.
*G06F 17/30* (2006.01)

(52) U.S. Cl.
USPC ........... 707/696; 707/802; 707/812; 707/813; 711/100; 711/209

(58) Field of Classification Search
USPC ........... 707/696, 802, 812, 813; 711/100, 209
See application file for complete search history.

(56) References Cited

U.S. PATENT DOCUMENTS

| | | | | |
|---|---|---|---|---|
| 5,553,303 | A * | 9/1996 | Hayashi et al. | 1/1 |
| 5,644,763 | A * | 7/1997 | Roy | 1/1 |
| 5,748,952 | A | 5/1998 | Chadha et al. | |
| 5,752,243 | A * | 5/1998 | Reiter et al. | 1/1 |
| 6,112,286 | A * | 8/2000 | Schimmel et al. | 711/208 |
| 6,668,263 | B1 * | 12/2003 | Cranston et al. | 1/1 |
| 6,792,432 | B1 * | 9/2004 | Kodavalla et al. | 1/1 |
| 7,447,682 | B2 * | 11/2008 | Ng et al. | 1/1 |
| 7,966,298 | B2 * | 6/2011 | Bruso et al. | 707/675 |
| 2002/0143743 | A1 * | 10/2002 | Iyer et al. | 707/1 |
| 2003/0004938 | A1 * | 1/2003 | Lawder | 707/3 |
| 2003/0005300 | A1 * | 1/2003 | Noble et al. | 713/172 |
| 2011/0093905 | A1 * | 4/2011 | McKinley et al. | 725/92 |

* cited by examiner

*Primary Examiner* — Dennis Truong

(57) ABSTRACT

A technique is disclosed that avoids index page splits when inserting large numbers of rows into a table of a relational database. Keys in index pages are moved to successive index pages to make room to insert keys on the original index page. Where no room is available on successive pages, a new index page is created to hold moved keys. The result is typically a smaller chain of index pages with better locality than using the conventional insertion technique of splitting index pages.

20 Claims, 18 Drawing Sheets

INDEX PAGE SPLIT AVOIDANCE WITH MASS INSERT PROCESSING

BACKGROUND

This disclosure relates generally to the field of computer databases. More particularly, but not by way of limitation, it relates to a technique for avoiding or reducing index page splits when inserting large numbers of rows into a table of a relational database.

Computer databases have been an important part of enterprises for decades. Two major types of computer databases are hierarchical databases and relational databases. Hierarchical databases, which were developed prior to relational databases, are arranged into tree-like hierarchical structures representing logical relationships. Relational databases organize data into tables of rows and columns. One common relational database management system (DBMS) is the DB2® database system marketed by International Business Machines Corporation (IBM). (DB2 is a registered trademark of IBM.)

Relational databases typically store indices in addition to the actual data stored in the database. These indices allow efficient access to desired data in the database. Indices are typically implemented as B-trees, with the actual index data stored in leaf nodes in the B-tree.

In many relational databases, the leaf nodes are not individual key data, but groups of keys and associated data, typically kept as pages of a fixed size convenient for the underlying computer system. For example, in a DB2 database, index leaf pages can be 4 KB, 8 KB, 16 KB, or 32 KB in size, and are typically stored as 4 KB pages on disc. Each page contains a group of index keys, sequentially ordered on the page.

Also typically, non-leaf nodes store key data representing the highest key value on corresponding leaf nodes. They also contain groups of keys, but without the associated data stored in the leaf pages. The non-leaf page structure and sizes are typically the same or similar to leaf pages.

In addition to the links that are found in a traditional B-tree to allow traversal of the B-tree, some DBMSs, such as DB2, link leaf pages together in an index with a leaf-page chain pointer. This allows efficient searching for a key or group of keys in situations where traversal of the B-tree would be less efficient. For example, when a truncated search (a search where only a first portion of the desired key is identified in the search) is allowed, traversing the leaf-page chain to get to the next leaf page may be more efficient than traversing the B-tree multiple times.

In such a leaf-page chain, each leaf page in the leaf-page chain has keys that are higher in value (according to some predetermined collating sequence) than the keys in the previous page in the leaf-page chain. Therefore, a search that traverses the B-tree to find the first of a desired set of index leaf pages may start at the first page, read all of the keys on that page, then follow the leaf-page chain to the next page, repeating the procedure to get the desired index keys in sequential order.

Insertion of data into the database adds to the index leaf pages keys that correspond to the inserted data. The inserted keys generally must preserve the sequential ordering of key data in the leaf pages. When a key is added that cannot be placed on an existing leaf page in correct sequential order because there is no room to insert the key on that page, a page split is typically performed to make room for the new key on one of the two resulting pages.

Insertion into leaf pages that cause page splits, or insertions that do not cause a split but modify the highest key value on the leaf page may cause an update of one or more non-leaf pages. Non-leaf pages may also be split when there is no space available to accommodate the high key on new pages caused by leaf page splits. The process is similar to leaf page splits.

Page splits tend to be expensive in terms of time, processing resources, and input/output (I/O) operations, and a way of reducing the number of page splits has long been desired. In addition, page splits have tended to result in less than optimal leaf-page chains. As a result, relatively expensive and time-consuming database reorganizations are frequently performed by database administrators (DBAs) because of inefficiencies resulting from page splits and complex leaf-page chains related to index key insertions.

SUMMARY

In one embodiment, a method is disclosed. The method comprises identifying a first page in a key-ordered chain of index pages of a database implemented in a computer system in which to store a first key value; moving a second key value from the first page to an existing adjacent page of the key-ordered chain to make room for the first key value; and inserting the first key value into the first page.

In another embodiment, a computer readable medium is disclosed. The medium has instructions for a programmable control device stored thereon wherein the instructions cause a programmable control device to perform the method disclosed above.

In yet another embodiment, a computer system is disclosed. The computer system comprises a processor; a first datastore, operatively coupled to the processor; a database, stored in the first datastore; and a program datastore, operatively coupled to the processor. The database comprises a plurality of data records, each containing a key value; a plurality of index key pages, each containing a plurality of keys ordered according to a collating sequence, the plurality of index key pages linked in a key-ordered chain of index key pages. The program datastore is configured to hold programs that when executed, cause the processor to perform the method disclosed above.

In yet another embodiment, a method is disclosed. The method comprises receiving a new key for insertion into a key-ordered chain of index pages of a database implemented in a computer system; determining whether a first index page in the key-ordered chain of index pages of has room to insert the new key; moving a key from the first index page to an existing adjacent index page in the chain of index pages if the first index page does not have room to insert the new key; and inserting the new key into the first index page.

In yet another embodiment, a computer readable medium is disclosed. The medium has instructions for a programmable control device stored thereon wherein the instructions cause a programmable control device to perform the second method disclosed above.

In yet another embodiment, a networked computer system is disclosed. The networked computer system comprises a plurality of computers communicatively coupled, at least one of the plurality of computers programmed to perform at least a portion of the second method disclosed above wherein the entire second method disclosed above is performed collectively by the plurality of computers.

DETAILED DESCRIPTION

A technique for inserting keys into index leaf pages moves keys between index leaf pages to reduce the number of page splits required. In addition to reducing the number of page splits, the technique results in leaf-page chains that are less complex and that may have fewer leaf pages, even after page splits, than conventional techniques for inserting keys.

A similar technique allows moving high-key values between non-leaf pages to reduce the number of page splits in non-leaf pages. In addition to reducing the number of non-leaf page splits, the technique results in less complex non-leaf page B-tree pointers and fewer non-leaf pages than conventional techniques for splitting non-leaf pages.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts are understood to reference all instance of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although the following description is written in terms of an IBM DB2 database, the present invention is not so limited, and the techniques described herein may be used to insert data into any relational database that uses index pages and leaf-page chains for storing index keys. In addition, although the following is written in terms of insertions of individual records of data into a database, the techniques described herein may be used for mass loading of data into a database.

The following description is written in terms of insertion of keys into leaf pages. Similar techniques are applied to non-leaf pages but are not set forth in detail herein, because the techniques are so similar that one skilled in the art will be enabled to perform the technique on non-leaf pages. The following description of leaf-page inserts points out where non-leaf page updates are likely to occur.

Figure 1:
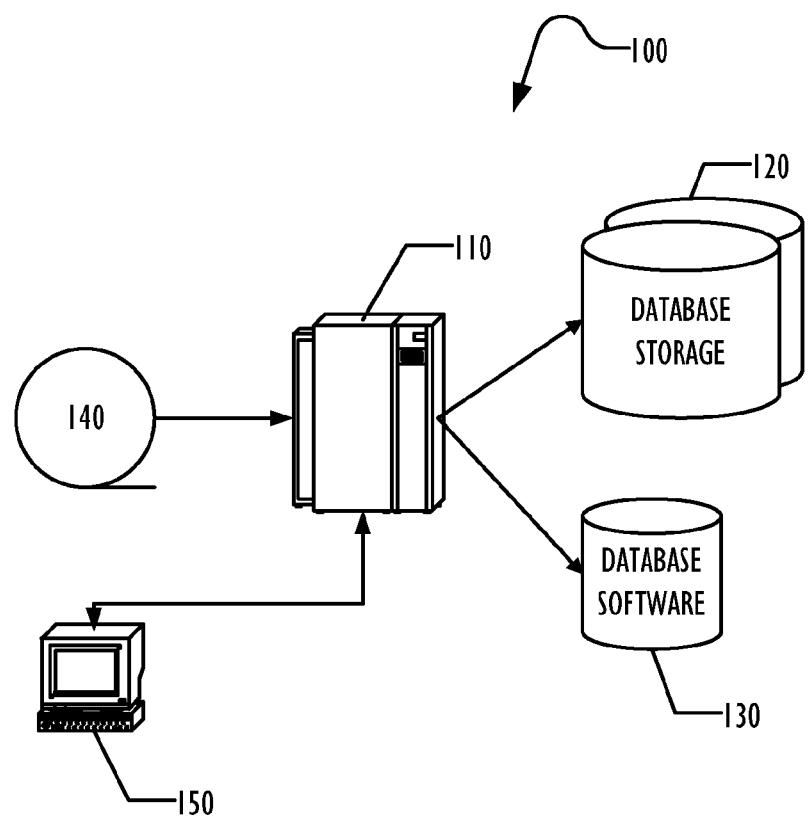
FIG. 1 illustrates, in block diagram form, an example of a computer system for managing a relational database according to one embodiment.

FIG. 1 is a block diagram illustrating a system 100 for managing a relational database system according to one embodiment. A mainframe computer 110 executes a relational database software to manage a relational database stored on datastore 120. The relational database software is stored on a program datastore 130. The relational database software may be a collection of database software modules, some of which may be provided by a first vendor and some of which may be provided by other vendors. In other database management systems, all of the database software is provided by a single vendor.

The datastore 120 providing storage for the relational database may provide storage for multiple DB2 databases and other desired data, and may be implemented as one or more physical units or logical units allocated on physical units. Datastore 120 may be directly connected to the DB2 database software computer system 110 or may be remotely connected, such as via a storage area network (SAN). Databases stored on the datastore 120 are typically stored in one or more datasets or files, but may be stored using any technique known to the art.

Data may be loaded into the database from tape unit 140 or from any other source of data, including other computer systems communicatively coupled to the computer system 110. A database administrator (DBA) may submit a request to perform operations on databases stored in the datastore 120 from another computer system, such as a workstation or terminal 150 communicatively coupled to the computer system 110.

Conventional features of the computer system 110 are omitted from FIG. 1 for clarity, but one of ordinary skill in the art will understand that it comprises at least one processor and frequently more than one processor, memory, input/out devices, and storage devices, including, but not limited to, all forms of optical and magnetic storage elements including solid-state storage, including removable media for storage of programs and data. In some embodiments, it may also comprise one or more network interfaces, displays, and user interaction elements such as a keyboard, mouse, and other conventional hardware features such as devices for use with removable media. The computer system 110 is typically of a class of computers known in the art as mainframe computers, running the z/OS® operating system and the DB2 database management system software, but may be any computer capable of managing a relational database as described below. (Z/OS is a registered trademark of IBM.)

Other client and server computer systems may be connected to the computer 110 to use or control databases stored in datastore 120, using any communications or operative coupling technique known to the art, but are omitted from the drawing for clarity.

Figure 2:
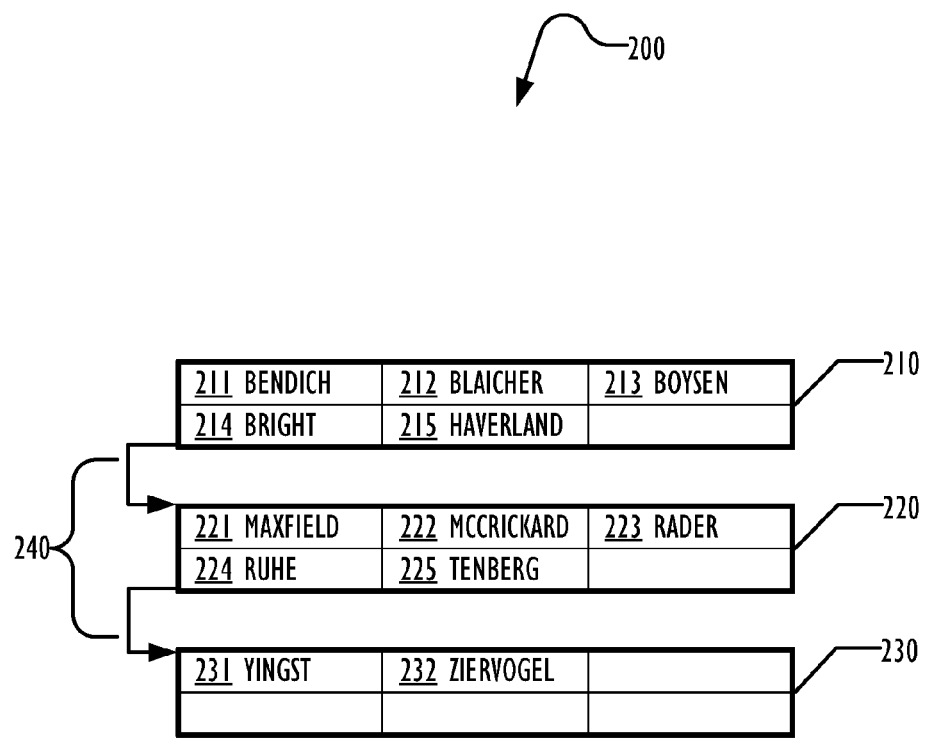
FIG. 2 illustrates, in block diagram form, an example of a collection of index leaf pages.

FIG. 2 is a block diagram illustrating a collection 200 of index leaf pages 210, 220, and 230. In this example, the keys are surnames of people involved in a project, but keys may have any values and be of any type of data selected by a DBA. This example is used to demonstrate the traditional index insert procedure that results in undesirable page split activity and undesirably complex leaf-page chains. The index 200 in FIG. 2 is perfectly organized, with room in each page for one additional index entry. The leaf-page chain 240 is in perfect sequence. The discussion below first illustrates the conventional technique for inserting keys into leaf pages 210, 220, and 230, then illustrates embodiments of a technique for inserting keys that reduces page splits and eliminates leaf-page chain complexity that arises in the conventional technique.

Although the following is written in terms of key-ordered leaf pages where the ordering is in ascending key value order, one of skill in the art will understand that embodiments that are ordered in descending key value order may be implemented using similar techniques.

In the following discussion, a page under discussion in the leaf-page chain may be referred to as the current page. A reference to the next or successor page of the current page in the leaf-page chain should be understood to mean the page in the leaf-page chain that is linked to the current page and that has higher key values than those in the current page. Similarly, a reference to a previous or predecessor page of the current page in the leaf-page chain should be understood to mean the page in the leaf-page chain that is linked to the current page and that has lower key values than those in the current page. Movement along the chain or inside of a page is forward movement when the movement occurs in ascending order of keys, such as to a successor leaf page. Similarly, movement is backward movement when it occurs in descending order of keys, such as to a predecessor leaf page. Any technique known in the art for linking two pages together may be used. In some embodiments, each page in the leaf page chain may comprise a field or element that points to a successor page. In some embodiments, each page in the leaf page chain may comprise a field or element that points to a predecessor page. Some embodiments may provide both successor and predecessor points, allowing easy traversal of the leaf-page chain in either direction. The relationships described above are logical relationships, and do not assume any spatial relationship or physical layout in an implementation. For example, an embodiment may implement leaf pages such that they are logically adjacent, but physically separated by other data when stored in memory or on disc.

In the following description, when reference is made to adding a key, it should be understood to mean adding the referenced key into a leaf page at the indicated location. Although the DBMS also inserts data records into the database that correspond to the keys inserted into the leaf pages, the procedure for inserting the data records corresponding to the keys is outside the scope of the present invention and is not further described herein. Further, it will be recognized key entries typically contain data other than the key itself, such as a pointer to the data record containing the key value contained in the key entry. Reference to a key therefore should be understood to refer to the key itself and any associated data. The structure and other associated contents of the key entry are outside the scope of the present invention and are not further described herein. Although as described above, index key leaf pages typically comprise storage blocks of 4 KB or other sizes determined by the DBMS or selected by the DBA when the database is generated, the index key leaf pages illustrated herein are shown with a small number of entries for clarity of the drawings. The number of entries in leaf pages is illustrative and by way of example only, and any convenient number of key entries may be used.

Figure 3:
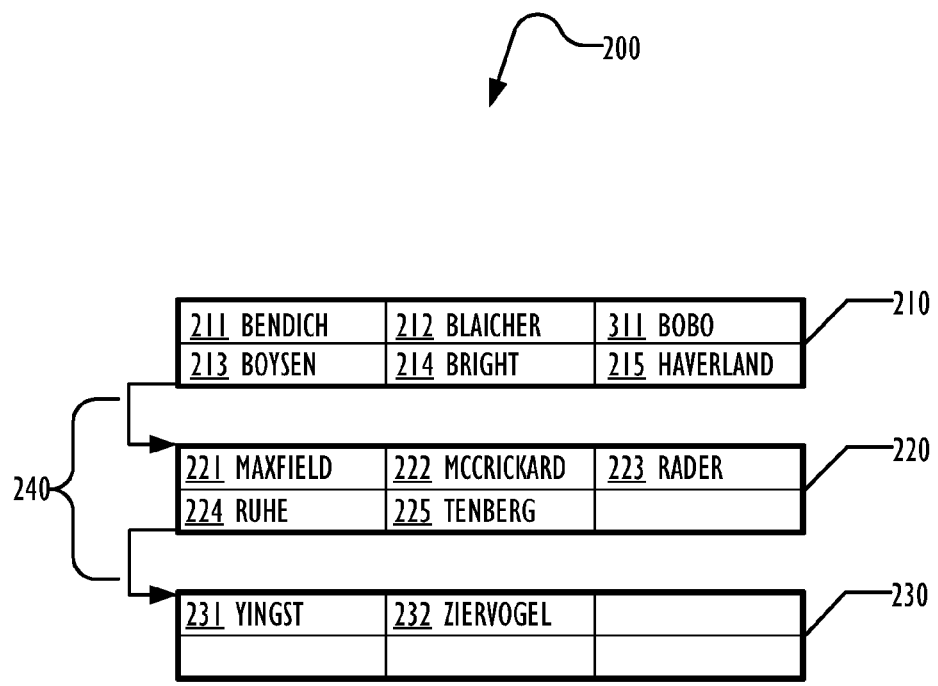
FIGS. 3-7 illustrate, in block diagram form, an example of inserting keys into the index leaf pages of FIG. 2 according to the prior art.

FIG. 3 begins the conventional technique for inserting keys. First, a DBA adds the name "Bobo" (301). To keep the keys in collating order sequence, "Bobo" (301) should be inserted into key page 210, and since there is room for one additional key, it will fit. To keep the keys on the page in sequential order, however, existing keys "Boysen" (213), "Bright" (214), and "Haverland" (215) may be moved to new slots to make room for the new key "Bobo" (301). The leaf-page chain 240 is unchanged by this insertion, which only affects leaf page 210.

Figure 4:
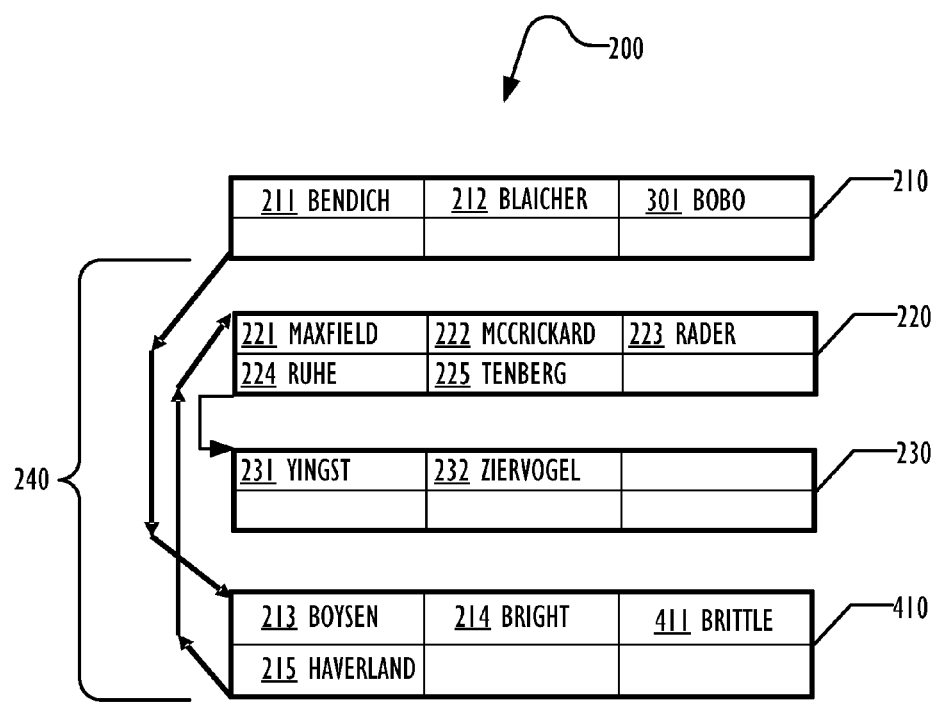

FIG. 4 is illustrates the insertion of yet another key, "Brittle" (411), which should be inserted between "Bright" (214) and "Haverland" (215). This time, there are no empty slots for the new key on page 210. Therefore, page 210 is split to make room to insert the new key. Typically, page splits are performed by splitting the page 210 in half, keeping the first half of page 210 in place, and moving the second half of page 210 to the new page, here page 410 that is created at the end of the index 200. Other techniques may be used for splitting the page 210 at other locations on the page, such as at the point of insertion of the new key.

As illustrated in FIG. 4, keys "Boysen" (213), "Bright" (214), and "Haverland" (215) have been removed from page 210 to new page 410. Conventionally, page 410 is written at the end of the dataset on disc in the datastore 120 that stores the database that includes leaf pages 200. New page 410 also contains the newly inserted key "Brittle" (411), in this example inserted in order between keys "Bright" (214) and "Haverland" (215). Thus, new page 410 contains the high half of the keys from page 210, and the newly inserted key "Brittle" (411).

When a leaf page split occurs, updates are typically required to corresponding non-leaf pages. When the new page 410 is added, the high key on the new page is inserted into the corresponding non-leaf page. Similar to leaf pages, if there is no room for a new key on the non-leaf page a split must occur at that level as well. If a non-leaf page split occurs, and there is a B-tree level above that non-leaf page, a similar update is made at the higher level and so on. A similar technique is used at each level of the B-tree to update and split pages where necessary.

The leaf-page chain 240 has become more complex. Instead of a simple chain from page 210 to page 220, and thence to page 230, chain 240 now runs from page 210 to page 410, and back to page 220, and thence to page 230. A sequential search through the index key leaf pages thus must go from the beginning of the dataset holding the leaf pages to the end (where newly inserted pages are stored) and back again, which when accessing those pages on disc may increase the time and number of I/O operations required to perform the access.

Figure 5:
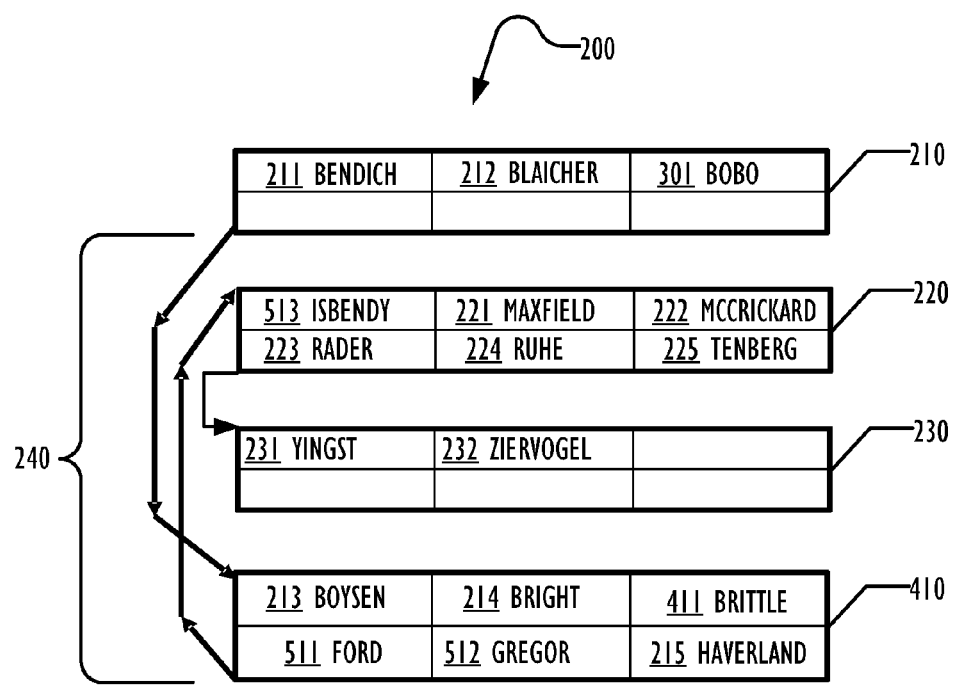

In FIG. 5, more keys are inserted: "Isbendy" (513), "Ford" (511), and "Gregor" (512). These keys fit into the pages 220 and 410 where they should be inserted, therefore no splits are needed.

Figure 6:
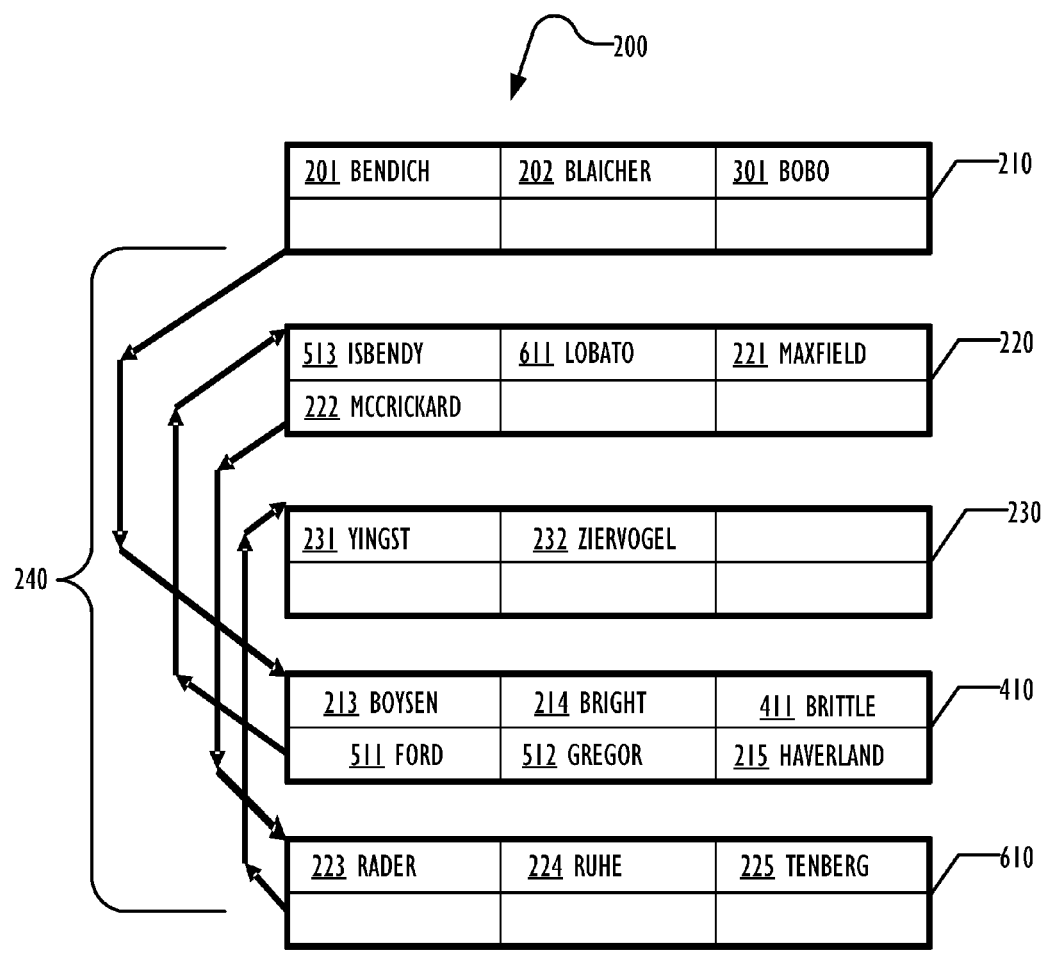

The next key to be inserted, "Lobato" (611), will not fit into page 220, where it should be inserted, so another page split is required, illustrated in FIG. 6. Once again, the page that has no room, in this case page 220, is split. Keys "Rader" (223), "Ruhe" (224), and "Tenberg" (225) are moved to new page 610. Keys "Maxfield" (221) and "McCrickard" (222) are moved on the page 220 to provide room for the new key "Lobato" (611) in the proper order, and the insert is completed on page 220, which was originally split. New page 610 is written to the end of the dataset. Again, the leaf-page chain 240 has increased in complexity. As described earlier, non-leaf pages are typically updated and possibly split to accommodate the new page 610.

Figure 7:
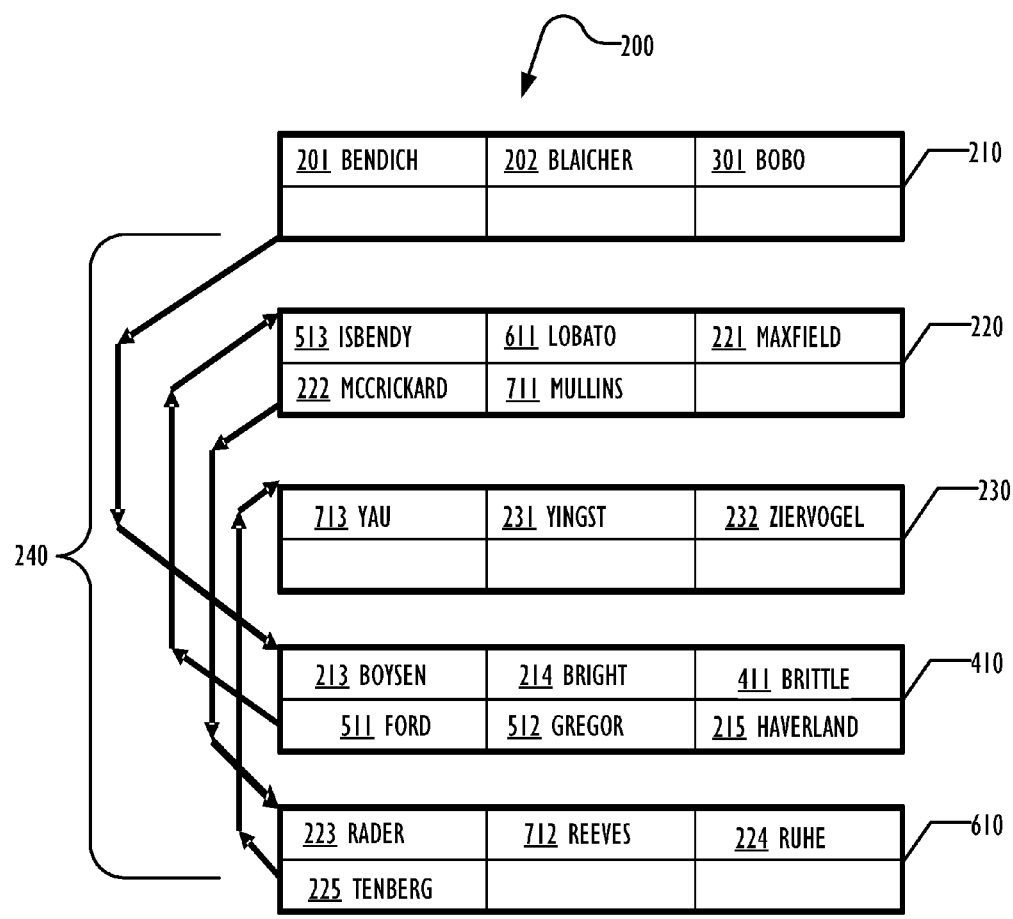

Completing the insert processing, in FIG. 7 three more keys are inserted: "Mullins" (711), "Reeves" (712), and "Yau" (713). "Mullins" (711) is inserted on page 220, without moving any of the other keys. "Reeves" (712) is inserted on page 610, moving keys "Ruhe" (224) and "Tenberg" (225) to make room in the proper order. Finally, "Yau" (713) is inserted on page 230, moving keys "Yingst" (231) and "Ziervogel" (232).

At the completion of the insert, two page splits have been performed, resulting in five leaf pages (210, 220, 230, 410, and 610), which are no longer in order in the index 200. The leaf-page chain 240 is much more complex than the leaf-page chain of FIG. 2. Reading this index 200 sequentially may be very time consuming, because of the need to move from one end of the index 200 to the other. In addition, the pages 210, 220, 230, 410, and 610 are not well balanced. One is full (new page 410) and two are half-full (original pages 210 and 230). One page (new page 610) has room for two keys and one (original page 220) has room for one key.

Now consider again the initially perfectly organized index 200 of FIG. 2 and the insertion of the same keys. FIGS. 8 to 18 illustrate a technique for inserting keys into the index 200 that reduces page splits and the leaf-page chain complexity of the conventional technique according to various embodiments.

Figure 8:
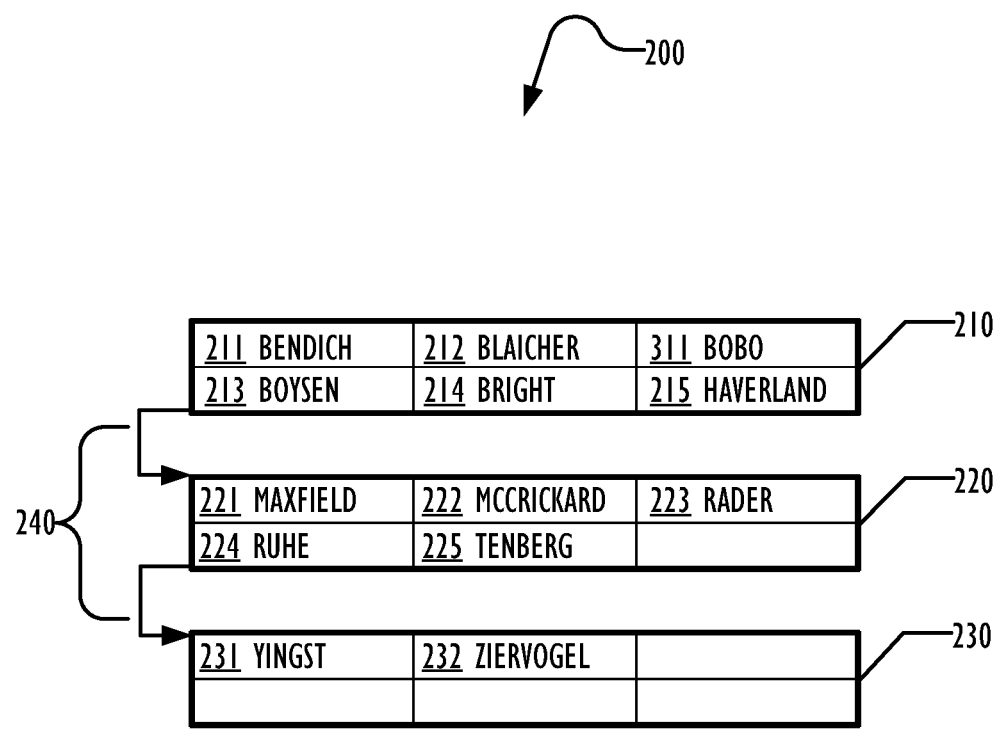
FIGS. 8-14 illustrate, in block diagram form, an example of inserting keys into the index leaf pages of FIG. 2 according to disclosed embodiments.

FIG. 8 begins by inserting a key into page 210. First, a DBA adds the name "Bobo" (301). To keep the keys in collating order sequence, "Bobo" (301) may be inserted into key page 210, and since there is room for one additional key, it will fit. To keep the keys on the page in sequential order, however, existing keys "Boysen" (213), "Bright" (214), and "Haverland" (215) may be moved to new slots to make room for the new key "Bobo" (301). The leaf-page chain 240 is unchanged by this insertion, which only affects leaf page 210. As can be seen by a comparison of FIGS. 3 and 8, the result of this insertion according to the illustrated embodiment is the same as the result of the conventional technique.

Figure 9:
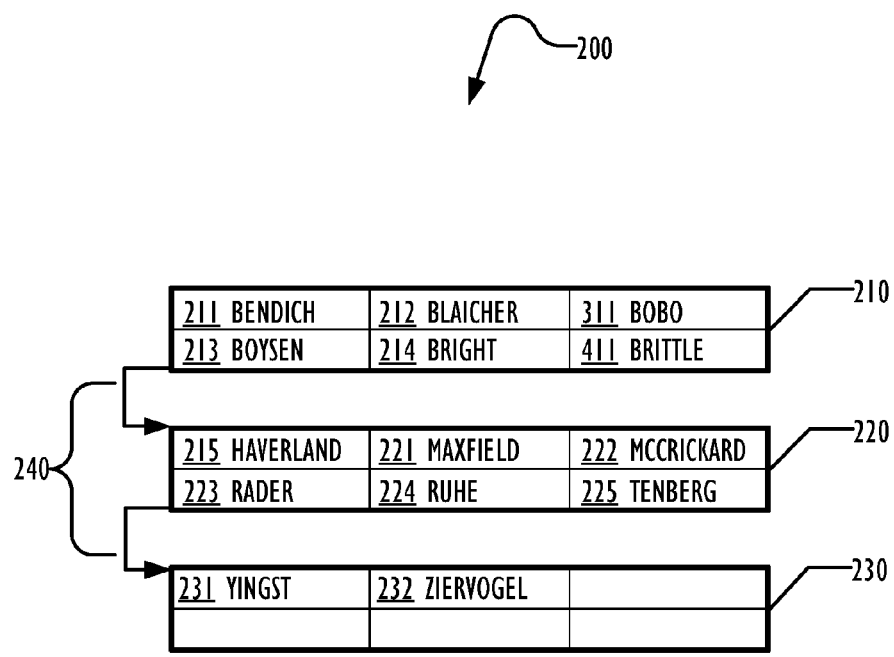

In FIG. 9, differences from the conventional technique begin to appear. To insert the next key "Brittle" (411), instead of splitting page 210, this embodiment examines the next page in the leaf-page chain (page 220) to see if there is room for another key there. Because there is, the highest key, "Haverland" (215), is moved from page 210 to page 220 to make room for "Brittle" (411) on page 210. The original keys on page 220 are also moved to make room for the key moved over from page 210. Because now there is room for "Brittle" (411) to be added onto page 210, no page split is required, and the leaf-page chain stays simple, connecting page 210 to page 220, and page 220 to page 230.

Because the highest key from page 210 is moved to page 220, changing the highest key value on page 210 to a new value, the corresponding non-leaf page is typically updated with the new high key value. This update will most likely just replace a value already in the non-leaf page and should not cause a non-leaf page split. Since no leaf page split occurs, the likelihood of non-leaf page splits is also reduced.

Figure 10:
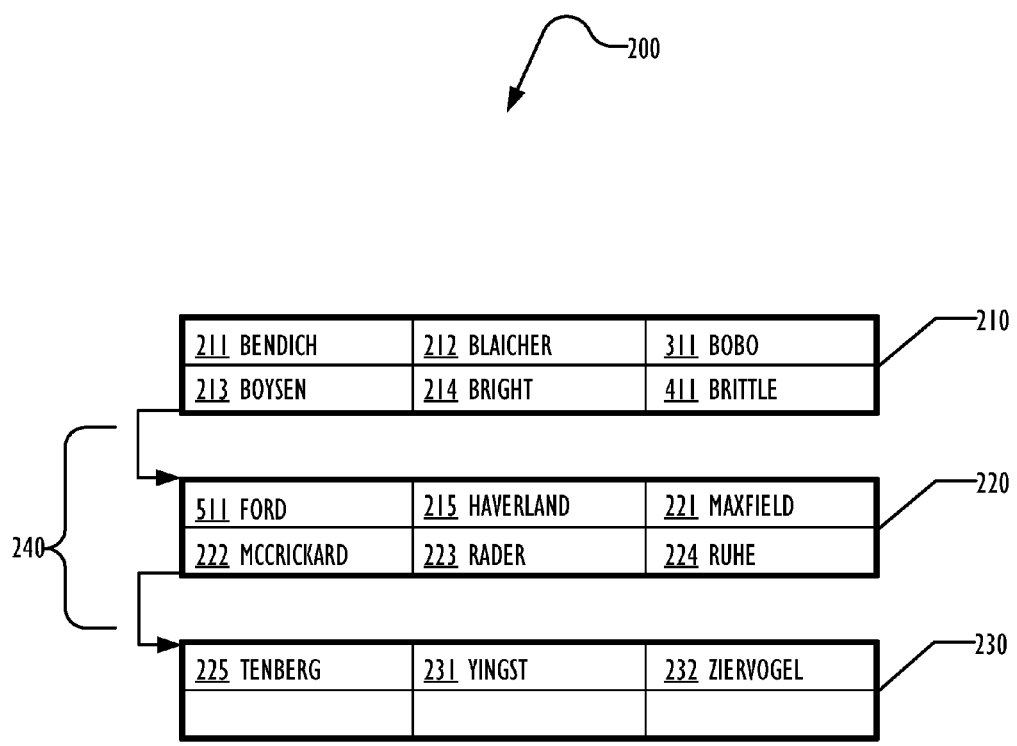

As before, the next key to be added is "Ford" (511). In FIG. 10, the attempt to add this key encounters the same out-of-space problem on page 220. Therefore, as was done in FIG. 9, the highest key, "Tenberg" (225), is moved from page 220 onto the next page 230, moving keys "Yingst" (231) and "Ziervogel" (232) to make room for "Tenberg" (225) on page 230. Then the new key "Ford" (511) is added in its proper place on page 220, moving the other keys up as necessary. No reordering of keys is necessary on either page. As described previously, the non-leaf page high key value for page 220 is typically updated in the non-leaf page.

Figure 11:
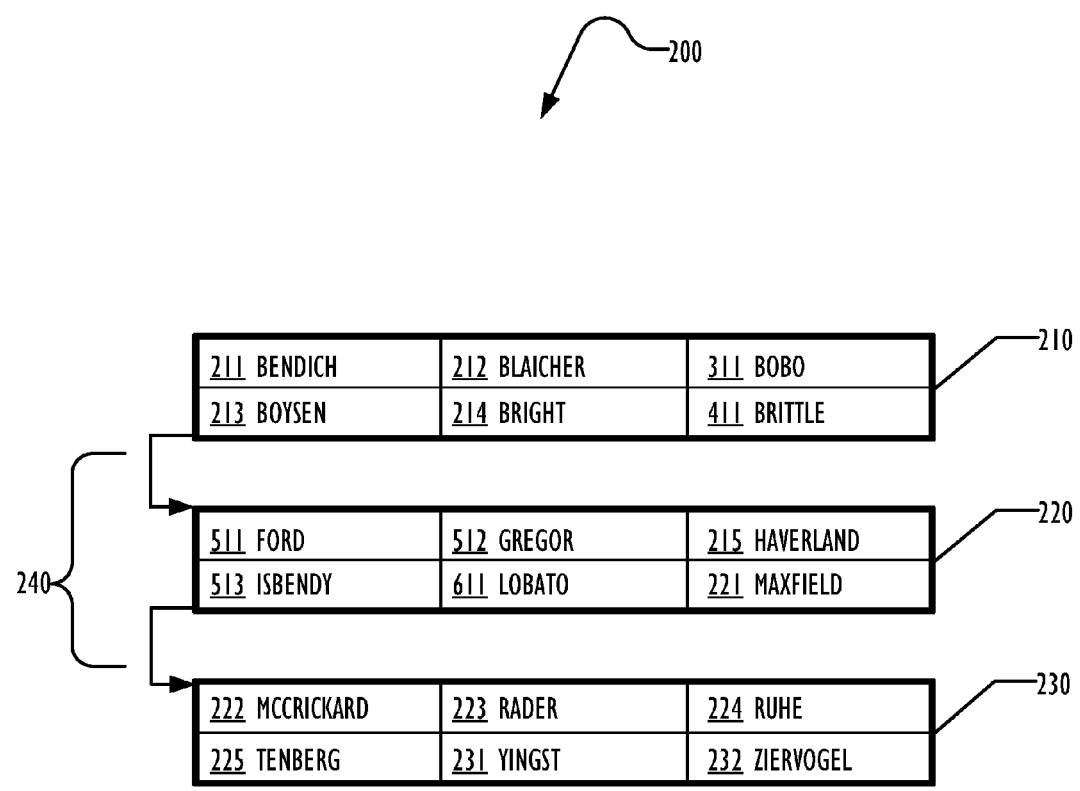

In FIG. 11, keys "Gregor" (512), "Isbendy" (513), and "Lobato" (612) are added. As before, where necessary, keys are moved from page 220 to page 230 with corresponding updates to non-leaf pages, and keys in those pages are moved up to provide a place to insert the new keys in their proper order. No page splits or leaf-page chain reordering are necessary to accomplish these insertions. Comparing FIG. 11 to FIG. 6, the pages of index 200 according to the embodiment illustrated in FIG. 11 are fuller, but better organized. In addition, fewer pages are used in the embodiment of FIG. 11 (three pages) than in the conventional technique illustrated in FIG. 6 (five pages). Traversing the leaf-page chain of FIG. 11 therefore may be more efficient than with the conventional result.

Figure 12:
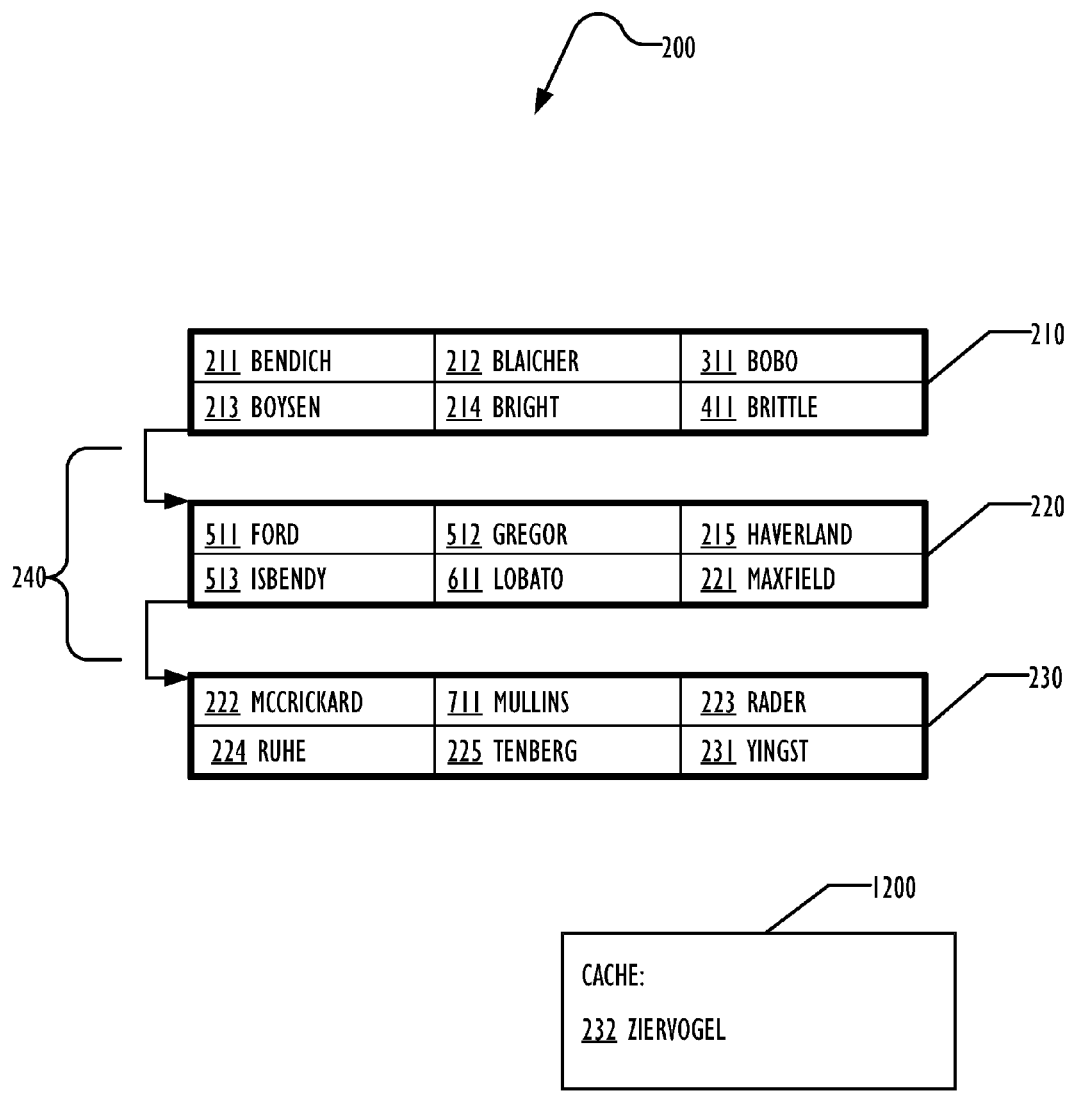

Turning now to FIG. 12, another key, "Mullins" (711), is the next key to be inserted. Page 230, where this key should be inserted, is the last page in the leaf-page chain, and is already full, however. Therefore, there is no room to insert the new key 711 into page 230, and there is no other page to which the highest key, "Ziervogel" (232), can be moved. Instead of splitting page 230, according to one embodiment the highest key, "Ziervogel" (232), is moved from page 230 to a cache 1200, making room for the new key "Mullins" (711), which may be inserted into page 230, moving higher keys up to allow a place for the new key on page 230 in the proper order. As the highest key value on page 230 changes, the corresponding non-leaf page is also typically updated.

Figure 13:
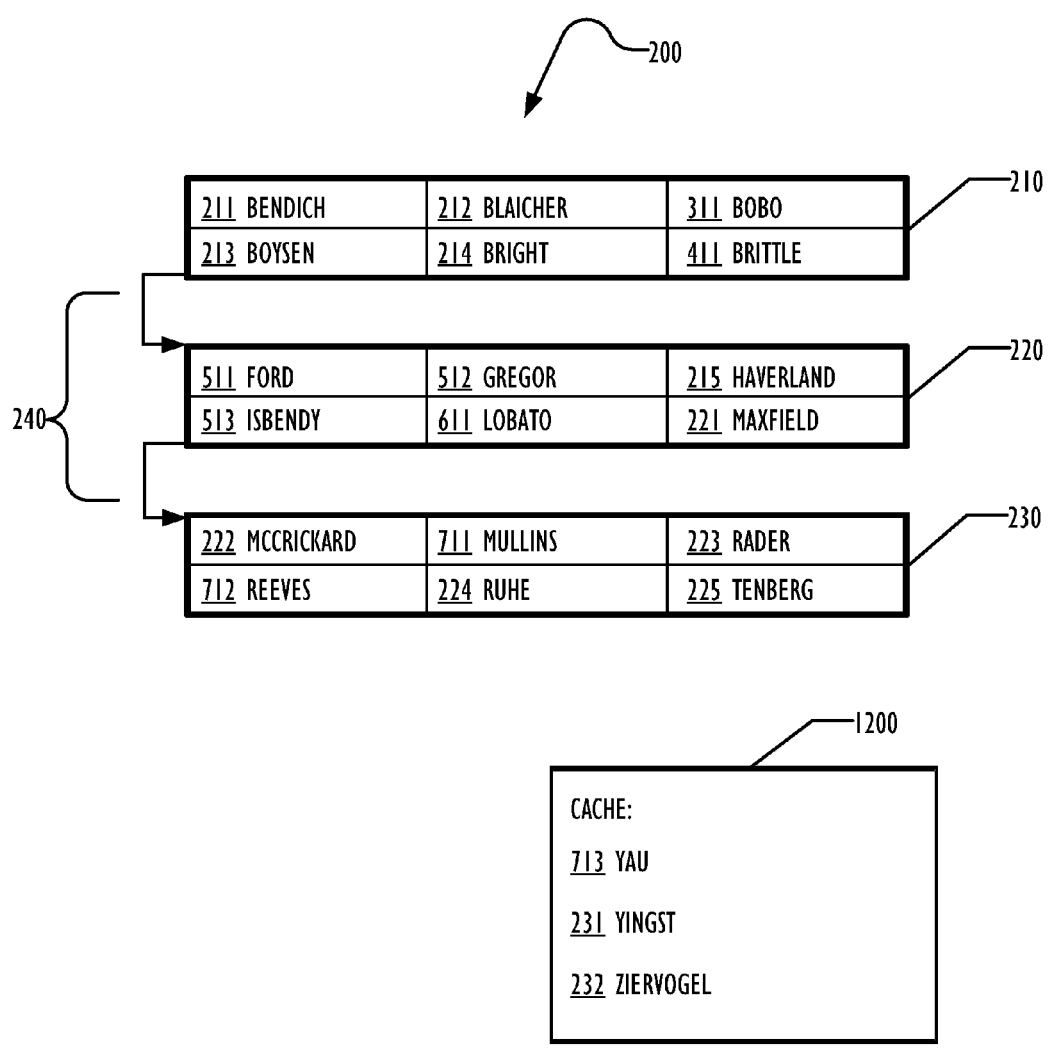

In FIG. 13, a similar process moves key "Yingst" (231) to the cache 1200 to make room for key "Reeves" (712) in page 230. In addition, key "Yau" (713) is added, but directly to the cache 1200, since it is higher than any key on the last page 230. Thus, after adding all of the inserts done in the conventional technique, pages 210, 220, and 230 remain, no page splits have been performed, and the leaf-page chain 240 remains a simple chain of sequential pages.

The keys that have been placed into the cache 1200 may be added into the leaf-page chain. In one embodiment, the keys may be left in the cache 1200 until the cache 1200 reaches a predetermined size. Instead of splitting pages, in FIG. 14, according to one embodiment, a new page 1410 may be created at the end of the dataset, and keys "Yau" (713), "Yingst" (231), and "Ziervogel" (232) may be moved from the cache 1200 to the new page 1410. The leaf-page chain 240 may be extended from page 230 to new page 1410. In one embodiment, the cache 1200 may be cleared after the creation of page 1410.

With the creation of new page 1410, a corresponding non-leaf page must be updated to include the highest key value on the new leaf page. This addition could drive the need to move keys across non-leaf pages similar to key movement across leaf pages. The technique, including caching, will be similar for non-leaf pages.

Figure 14:
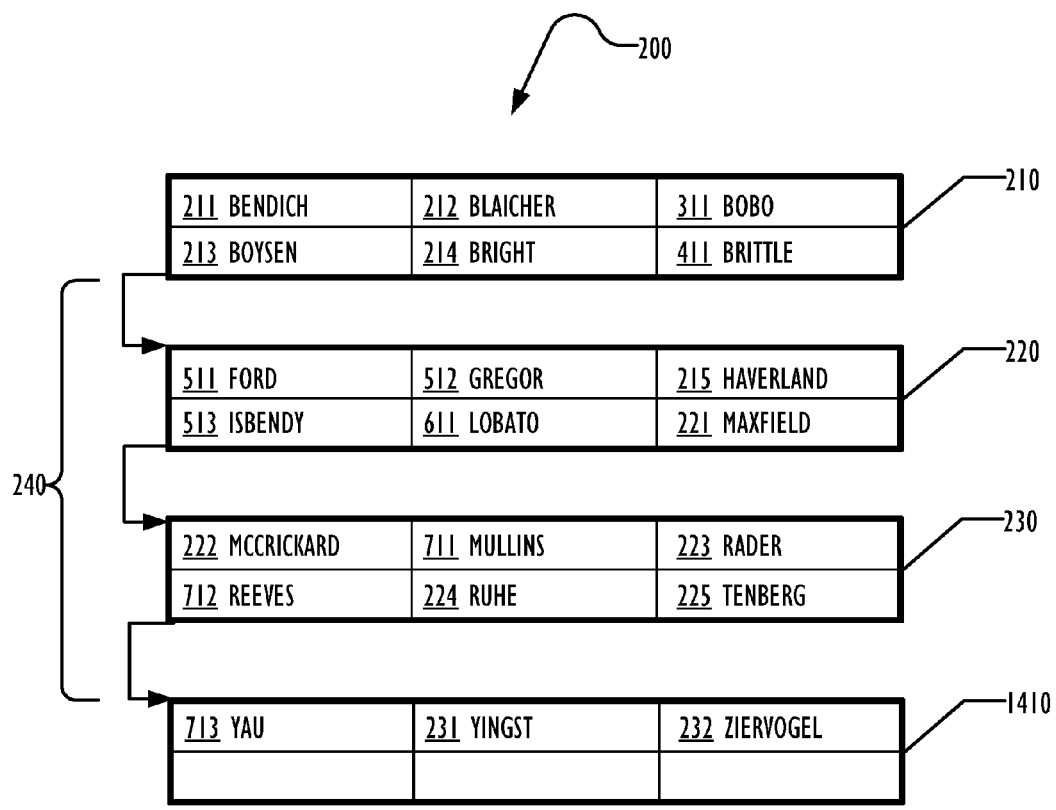

Compare FIGS. 7 and 14. The disclosed embodiment results in only four pages, instead of five, and a leaf-page chain that is in perfect sequential order. No page splits were required, and the resulting leaf pages provide a more efficient configuration of pages in the index 200, allowing traversal with less I/O, at the cost of some moving keys from one page to another during the insertion procedure. The pages 210, 220, 230, and 1410 are as balanced as possible, with pages 210, 220, and 230 being full, and only the highest or last page 1410 having empty space. Three more keys can be added to this configuration before any additional pages are required, regardless of the keys to be added.

In contrast, the conventional technique would require additional page splits and leaf-page chain complexity if any one key has to be added to page 410, if two keys have to be added to page 220, or if three keys have to be added to page 610. Thus, the disclosed technique may increase its advantage over the conventional technique as additional keys are added to the index 200.

Figure 15:
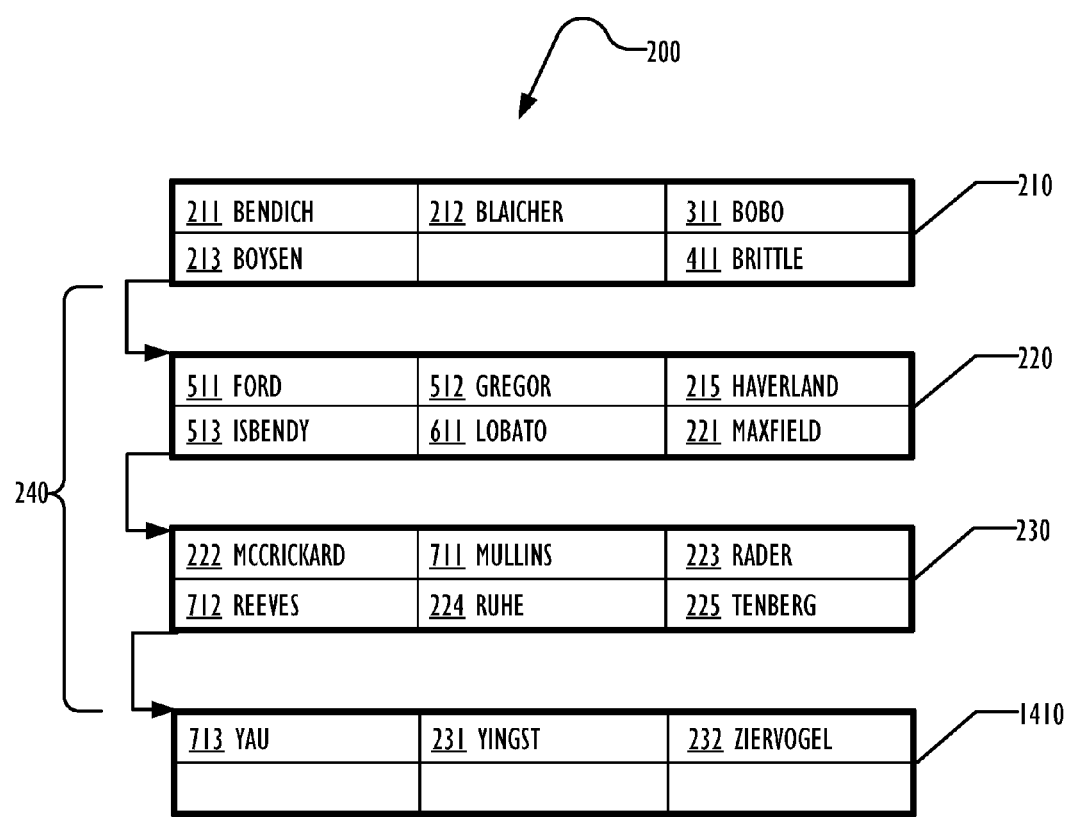
FIG. 15-16 illustrate, in block diagram form, an example of inserting keys into index leaf pages according to another embodiment.
Figure 16:
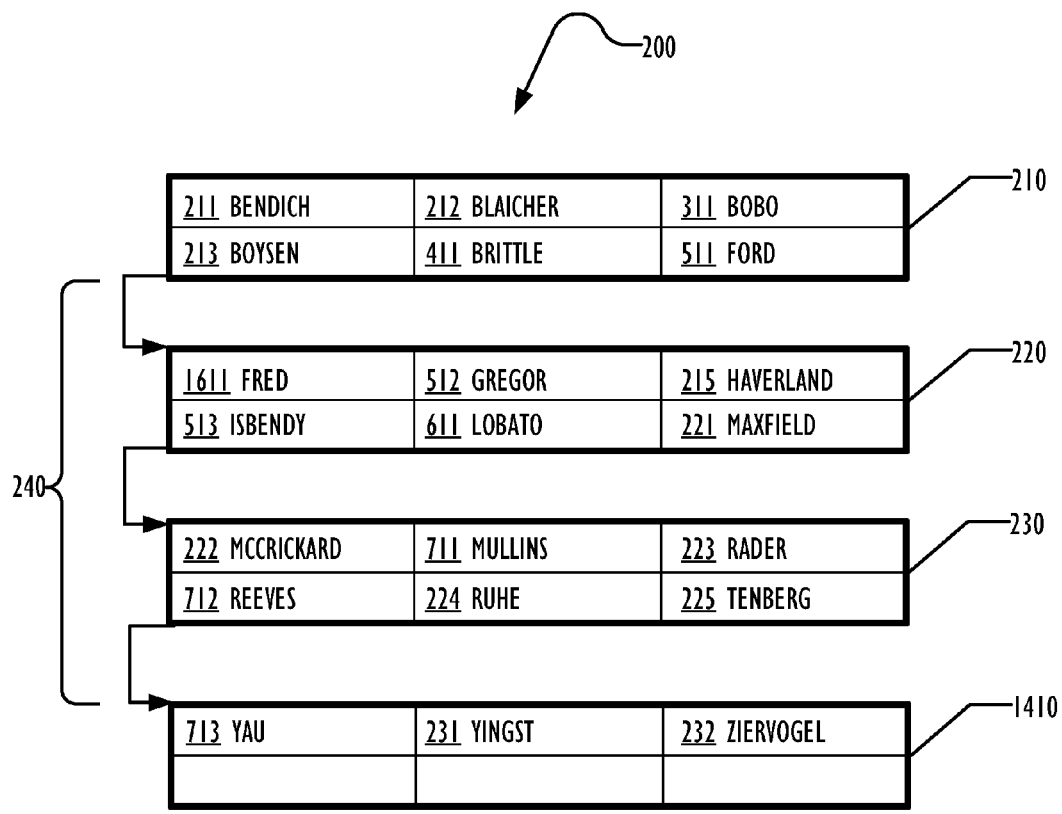

FIGS. 15 and 16 illustrate a further embodiment that provides additional opportunities for finding space to insert a new key. FIG. 15 is the index 200 of FIG. 14 after the deletion of key "Bright" (214). If a new key "Fred" is to be inserted, in this embodiment, a search of both the previous and next pages in the leaf-page chain may be performed. In the embodiment of FIGS. 8-14, the highest key on page 220, "Maxfield" (221), may be moved up to page 230, bumping the highest key of that page, "Tenberg" (225) to page 1410. In the embodiment of FIGS. 15-16, instead of moving keys upward in the chain, key "Ford" (511), the lowest key of page 220, may alternately be moved backwards in the index to page 210, filling the empty slot in page 210, with the result as illustrated in FIG. 16. In one embodiment, the decision to move forward or backward may be conditioned upon which action involves the greatest amount of key movement or fewest I/O operations, with the lesser amounts preferred. If moving forward in the index would require the addition of a new page, but moving backward in the index is possible, then moving backward would be selected according to one embodiment. This embodiment increases the possibility of finding space to insert a new key in the existing index pages, decreasing the need to build new pages.

Some DBMSs allows DBAs to specify a percentage of index key pages that should remain empty where possible. In a DB2 database, the PCTFREE parameter is a customer specified percentage of each page to be left free during REORG or INDEX BUILD processing to be used by potential future insert processing. In one embodiment, the insertion technique may attempt to maintain this percentage of free space on pages on which keys are inserted. Instead of moving keys from one page to another when the original page is completely full, as described in FIGS. 8-16, this embodiment may move keys to the next (or previous) page if inserting a key would make the original page more than PCTFREE full. In one embodiment, the PCTFREE parameter may be honored even if that resulted in the addition of a new page, as in FIGS. 12-14. In another embodiment, the PCTFREE parameter may be honored by moving keys between pages, as in FIGS. 8-11, but may be ignored if the result would be to add a new page. The latter embodiment may result in fewer pages, some of which are fuller than the PCTFREE value would indicate, while the former embodiment may result in preserving the preferred amount of free space, but at the cost of additional pages.

In one embodiment, groups of keys may be processed as a unit of work. When keys are encountered that are contiguous or at least within the range of contiguous pages currently in the leaf-page chain, those keys may be inserted as a single action, rather than individually. In such an embodiment, the DBMS may read ahead the keys that are to be inserted, and if several keys all will be destined for insertion on a single page or several adjacent pages, process the entire group of keys and pages as a single unit of work. This embodiment may increase the possibility of finding space to insert keys without having to build new pages and may result in less work spent moving keys among pages, by reducing multiple movements of the same group of keys.

For example, in the situation of FIG. 14, if keys "Randall" and "Randolph" are to be added, the embodiment described above may first move key "Tenberg" (225) from page 230 to page 1410, moving keys "Yau" (713), "Yingst" (231), and "Ziervogel" (232) in page 1410 to make room for key "Tenberg" (225), then move keys "Reeves" (712) and "Ruhe" (224) up to make room for key "Randall". Then, to insert the key "Randolph," keys "Reeves" (712), "Ruhe" (224), "Tenberg" (225), "Yau" (713), "Yingst" (231), and "Ziervogel" (232) may be moved a second time, this time moving key "Ruhe" (224) to page 1410. But if keys "Randall" and "Randolph" are inserted as a block, although both keys "Ruhe" (224) and "Tenberg" (225) may be moved to page 1410 as before, there is less duplication of movement, with keys moved only once instead of twice, even thought the resulting page configuration is the same.

The techniques of FIGS. 8-16 do not depend upon starting with a perfectly ordered chain of index key leaf pages as in FIG. 2, but may be used when beginning with a more complex chain of leaf pages such as illustrated in FIG. 7.

Because the movement of keys between index pages may result in cascading movement of keys across multiple pages, in one embodiment, the techniques of FIGS. 8-14 may be optionally limited to movement across a predetermined number of pages, so that the work involved in moving keys among existing pages does not become excessive. In such an embodiment, if no room is found within a predetermined number of pages to move keys for an insertion, then a page split may be performed and "rechaining" of the leaf-page chain may be performed as described in FIGS. 2-7.

Figure 17:
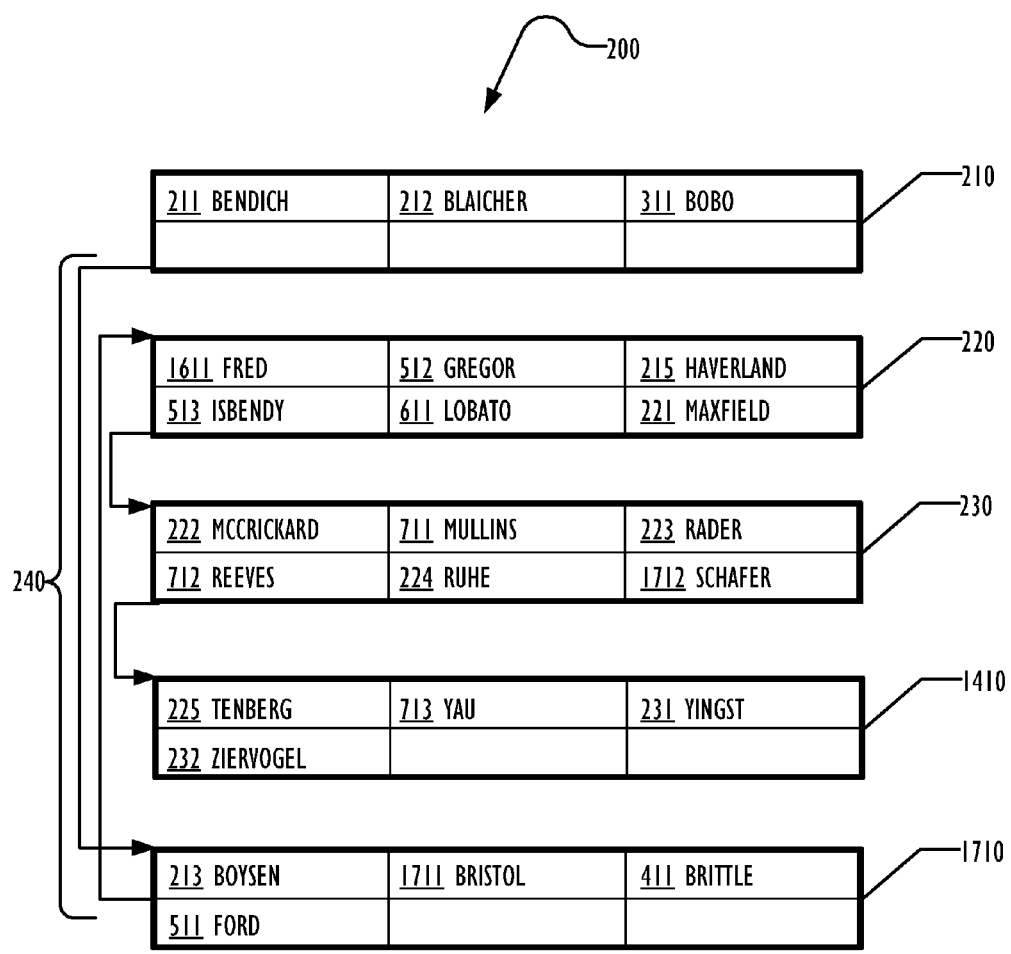
FIG. 17 illustrates, in block diagram form, an example of inserting keys into index leaf pages according to yet another embodiment.

For example, in one embodiment, movement may be limited to only one page. Thus, if no room is found on the immediate next page for movement of a key, then a page split may be performed. In the context of FIG. 16, if a new key "Bristol" is to be added, instead of moving key "Brittle" (411) to page 220, moving key "Maxfield" (221) to page 230, and key "Tenberg" (225) to page 1410, a page split of page 210 may be performed, similar to that described in FIG. 4, resulting in the configuration of FIG. 17. In this embodiment, although adding key "Bristol" (1711) may require a page split and leaf-chain rearrangement, addition of key "Schafer" (1712) may be accomplished by moving key "Tenberg" (225) to page 1410, and inserting key "Schafer" (1712) into page 230. Thus, the advantages of the page split avoidance and leaf-chain simplification technique may be balanced with lesser movement between pages as desired. In the conventional technique, both insertions would have resulted in page splits. In the embodiment illustrated in FIGS. 16-17, the number of page splits, while not eliminated, may be reduced. The limitation to a single nearby page for key movement illustrated in FIG. 17 is by way of example only. The predetermined number of pages to limit the movement may be any desired value, and may be a configuration parameter that may be selectable by the DBA.

Figure 18:
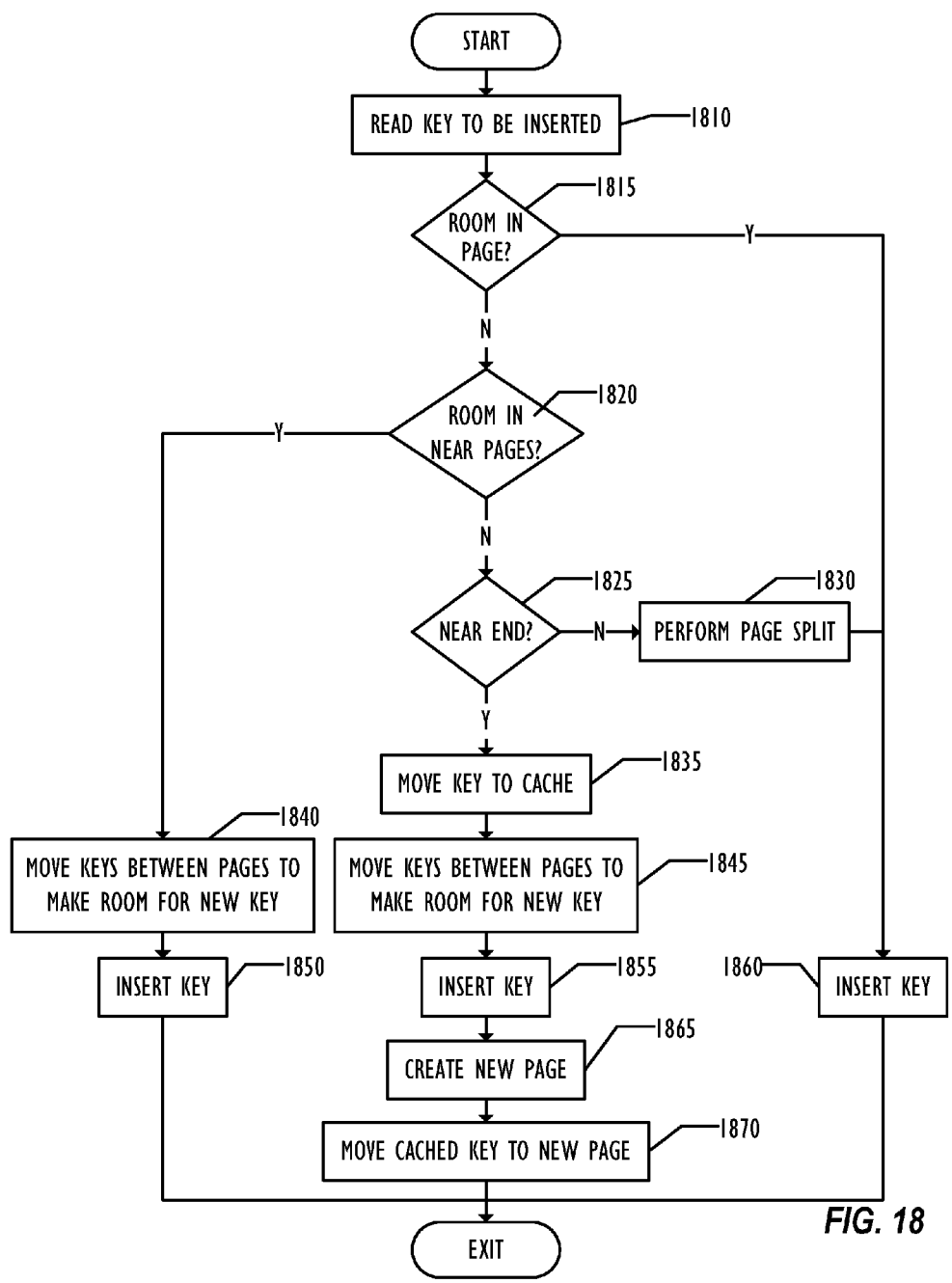
FIG. 18 illustrates, in flowchart form, an example technique for inserting keys into index leaf pages according to various embodiments.

FIG. 18 is a flowchart illustrating an embodiment of a technique for reducing page splits as described above. In block 1810, a key to be inserted into leaf pages may be read. In block 1815, the page where the key should be inserted may be determined or selected and checked to see if there is room for the new key in the page. If there is, then in block 1860, the key may be inserted in the proper sequential location in the page.

If there is no room in the appropriate page to insert the key, then in block 1820, nearby pages may be examined to determine whether there is room in a nearby page to insert a key. In one embodiment, "nearby pages" means the immediate successor page in the leaf-page chain. In another embodiment, "nearby pages" means the immediate successor or predecessor page. In yet another embodiment, "nearby pages" means a predetermined number of successor or predecessor pages, where the predetermined number is in a further embodiment selectable by the DBA. A page is adjacent to another page in the index pages if it is an immediate successor or predecessor page as determined by the leaf-page chain 240.

If there is room in the nearby pages to insert the key, then in block 1840 keys may be moved among the nearby pages to make room on the appropriate page for the new key. The nearby index pages are examined as a sequence of index pages. Key movement may involve a sequence of movements of the highest key on the selected and each nearby page in the sequence (if moving through successor pages) or the lowest key on the selected and each nearby page in the sequence (if moving through predecessor pages), until room for the new key is created on the selected page. Then in block 1850, the new key may be inserted in the selected page.

In one embodiment, the sequence of nearby pages considered runs from the successor of the page where the key is to be inserted to the penultimate page of the index pages, moving a key from each page in the sequence to a successor page.

If there is no room in nearby pages, then in block 1825, the technique may determine whether the selected page is near the last page of the index leaf pages, where "near" means within a predetermined number of pages from the last page. If the selected page is not near the last page, then a conventional page split may be performed in block 1830 and the key inserted in block 1860 in either the originally selected page or the new page, depending on the value of the new key. The page may be split at any desired place on the page.

If the selected page is near the end of the leaf pages, then in block 1835 the highest key may be moved from the last page to a cache 1200. In block 1845, keys in a sequence of index pages comprising the original and intervening pages between the original page and the last page may be moved to make room for the new key, which may then be inserted in block 1855. In one embodiment, blocks 1865-1870 may be delayed until the cache 1200 reaches a predetermined threshold size. A new page may be created in block 1865, so that the cached key(s) may be moved to the new page in block 1870.

The actions illustrated in FIG. 18 are illustrative and by way of example only, and other actions and ordering of actions may be performed. Actions indicated as a single block in FIG. 18 may be performed as multiple actions, and actions indicated as multiple actions in FIG. 18 may be combined into a single action, as convenient. Actions may be performed in different orders than illustrated.

The disclosed embodiments move keys among index key pages to make room for the insertion of new keys, adding new pages at the end where needed. The techniques disclosed may reduce page splits in index key leaf pages, and may provide leaf-page chains that are simpler and less complex than conventional techniques. The resulting index key leaf page chains may provide better query performance after the insertion procedure and may allow DBAs to reduce the frequency of REORG processing.

Various changes in the components as well as in the details of the illustrated operational method are possible without departing from the scope of the following claims. For instance, the illustrative system of FIG. 1 may be comprised of more than one computer communicatively coupled via a communication network, wherein the computers may be mainframe computers, minicomputers, workstations or any combination of these. Such a network may be composed of one or more local area networks, one or more wide area networks, or a combination of local and wide-area networks. In addition, the networks may employ any desired communication protocol and further may be "wired" or "wireless." In addition, acts in accordance with FIG. 8-18 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

It is to be understood that the above description is intended to be illustrative, and not restrictive. For example, the above-described embodiments may be used in combination with each other. Many other embodiments will be apparent to those of skill in the art upon reviewing the above description. The scope of the invention, therefore, should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method, comprising:
   identifying a first page in a key-ordered chain of index pages of a database implemented in a computer system in which to store a first key value;
   determining that the first page is full;
   responsive to the determining, determining that an existing adjacent page of the key-ordered chain is full;
   responsive to determining that the existing adjacent page is full, moving a key from each of a sequence of pages of the key-ordered chain of pages beginning with the existing adjacent page to make room in the existing adjacent page without splitting the existing adjacent page;
   moving a second key value from the first page to the existing adjacent page of the key-ordered chain after moving the key from each of the sequence of pages; and
   after moving the second key value, inserting the first key value into the first page.

2. The method of claim 1, the method further comprising:
   determining that the existing adjacent page is not full, and
   moving the second key value from the first page to the existing adjacent page of the key-ordered chain that has room for the second key value.

3. The method of claim 1, wherein the action of moving a key from each of a sequence of pages of the key-ordered chain of pages beginning with the existing adjacent page ends with a penultimate page of the key-ordered chain of pages; and the method further comprises:
   moving a highest key from a last page of the key-ordered chain of pages to a cache.

4. The method of claim 3, further comprising:
   creating a new page at the end of the key-ordered chain of pages; and
   moving keys from the cache to the new page.

5. The method of claim 4, wherein the action of moving keys from the cache to the new page is performed if the cache reaches a predetermined threshold size.

6. The method of claim 4, wherein the action of moving keys from the cache to the new page comprises:
   moving keys from the cache to the new page; and
   clearing the cache.

7. The method of claim 1, wherein the action of moving a key from each of a sequence of pages of the key-ordered chain of pages beginning with the existing adjacent page comprises:
   moving a key from each of the sequence of pages in reverse order of the sequence of pages.

8. A computer-readable storage device with instructions for a programmable control device stored thereon wherein the instructions cause a programmable control device to perform the method of claim 1.

9. A computer system comprising:
a processor;
a first datastore, operatively coupled to the processor; and
a database, stored in the first datastore, comprising:
a plurality of data records, each containing a key value,
a plurality of index key pages, each containing a plurality of keys ordered according to a collating sequence, the plurality of index key pages linked in a key-ordered chain of index key pages, and
a program datastore, operatively coupled to the processor, configured to hold programs that when executed, cause the processor to perform the method of claim 1.

10. A method, comprising:
receiving a new key for insertion into a key-ordered chain of index pages of a database implemented in a computer system;
determining that a first index page in the key-ordered chain of index pages does not have room to insert the new key;
responsive to the determining, defining a sequence of index pages from the first index page to a second index page in the chain of index pages, the second page existing at the time of the determining, and having room for an additional key, wherein the second index page is within a sequence of no more than a predetermined quantity of index pages;
freeing space in the first index page by moving a key from each index page in the sequence of index pages to an adjacent page in the sequence of index pages, including moving a key from the first index page to an existing adjacent index page in the chain of index pages without splitting the first index page; and
after moving the key from the first index page, inserting the new key into the first index page.

11. The method of claim 10, wherein the second index page is a successor index page to the first index page of the sequence of index pages and moving a key comprises:
moving a highest key of each index page to a successor index page in the sequence of index pages.

12. The method of claim 10, wherein the second index page is a predecessor index page to the first index page of the sequence of index pages and moving a key comprises:
moving a lowest key of each index page to a predecessor index page in the sequence of index pages.

13. The method of claim 10, wherein the action of defining a sequence of index pages from the first index page to a second index page in the chain of index pages comprises:
when the second index page is not within a sequence of no more than the predetermined quantity of index pages:
splitting the first index page into an original page and a split page, and
inserting the new key into one of the original page or the split page.

14. The method of claim 10, wherein freeing space in the first index page includes:
moving a first key from a last index page in the sequence of index pages to a cache of keys.

15. The method of claim 10, wherein
defining the sequence of index pages includes:
moving a highest key from a last index page of the chain of index pages to a cache of keys, and
defining the sequence of index pages as the first index page to the last index page of the chain of index pages; and
freeing space in the first index page includes:
moving a sequence of keys from members of the sequence of index pages to other members of the sequence of index pages, freeing space in the first index page,
creating a new index page as new last page of the chain of index pages, and
inserting keys from the cache of keys into the new index page.

16. The method of claim 15, further comprising:
performing the creating of the new index page when the cache reaches a predetermined threshold size.

17. A computer-readable storage device with instructions for a programmable control device stored thereon wherein the instructions cause a programmable control device to perform the method of claim 10.

18. A networked computer system comprising:
a plurality of computers communicatively coupled, at least one of the plurality of computers programmed to perform at least a portion of the method of claim 11 wherein the entire method of claim 10 is performed collectively by the plurality of computers.

19. The method of claim 10, wherein the first index page does not have room when inserting the new key would cause the first index page to exceed a percent full parameter.

20. A computer system, comprising:
at least one processor; and
memory storing instructions that, when executed by the at least one processor, cause the computer system to perform operations comprising:
determining that a first index page in a key-ordered chain of index pages of a database does not have room to insert a new key;
determining a first quantity of key movements for moving keys among a first sequence of index pages between the first index page and a second index page that precedes the first index page in the key-ordered chain and that has room to insert a key;
determining a second quantity of key movements for moving keys among a second sequence of index pages between the first index page and a third index page that succeeds the first index page in the key-ordered chain and that has room to insert a key;
when the first quantity is fewer than the second quantity, moving a lowest key of each index page to a predecessor index page in the first sequence of index pages;
when the first quantity is not fewer than the second quantity, moving a highest key of each index page to a successor index page in the second sequence of index pages; and
inserting the new key into the first index page.

* * * * *

UNITED STATES PATENT AND TRADEMARK OFFICE
CERTIFICATE OF CORRECTION

| | | |
|---|---|---|
| PATENT NO. | : 8,682,872 B2 | Page 1 of 1 |
| APPLICATION NO. | : 12/640549 | |
| DATED | : March 25, 2014 | |
| INVENTOR(S) | : Randol K. Bright | |

It is certified that error appears in the above-identified patent and that said Letters Patent is hereby corrected as shown below:

In the Claims

In column 14, line 28, in claim 18, delete "claim 11" and insert --claim 10--, therefor.

Signed and Sealed this
Third Day of June, 2014

Michelle K. Lee
*Deputy Director of the United States Patent and Trademark Office*